United States Patent Office 2,813,210
Patented Nov. 12, 1957

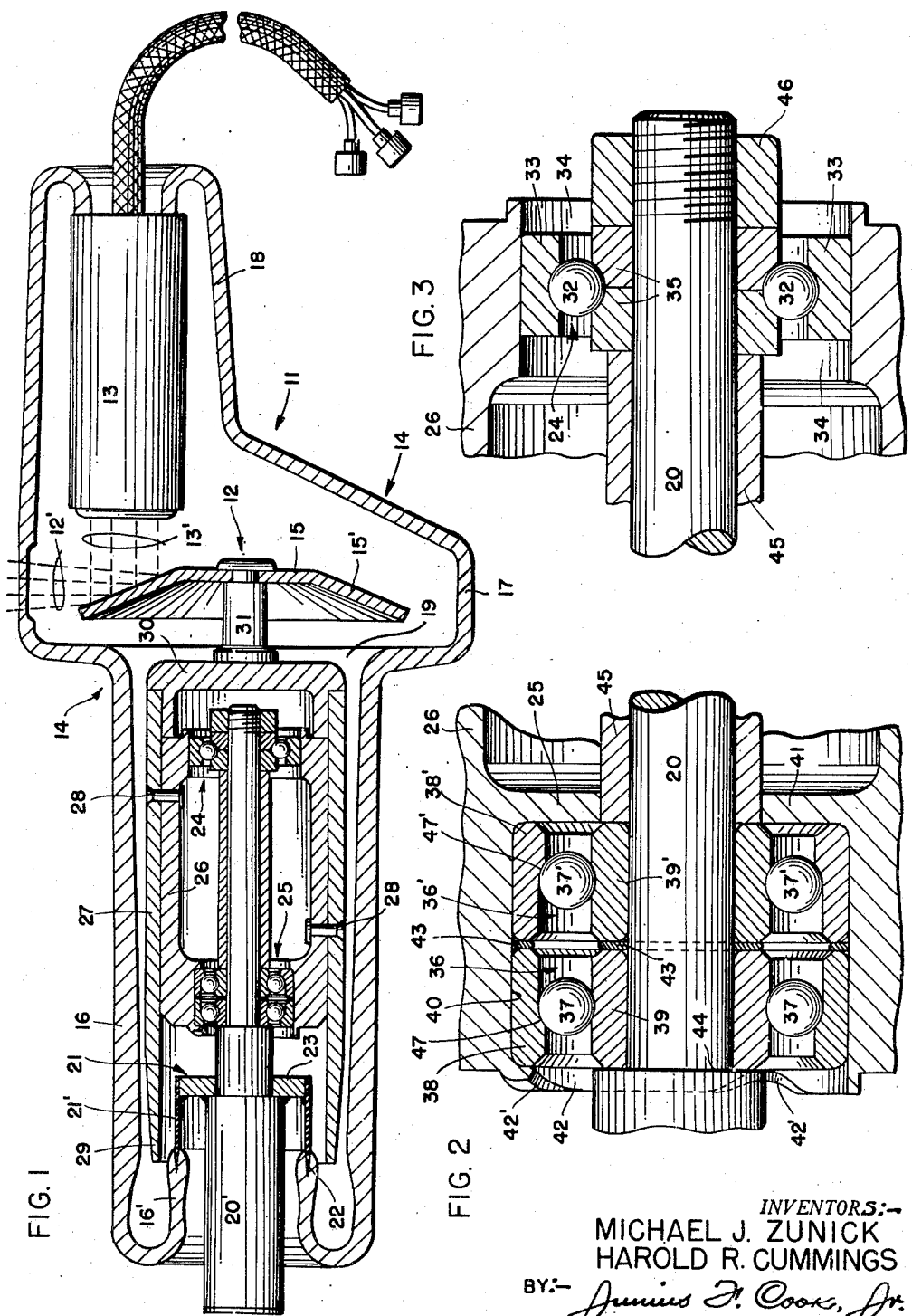

2,813,210

ROTATING STRUCTURE

Michael J. Zunick, Greenfield, and Harold R. Cummings, Waterford, Wis., assignors to General Electric Company, a corporation of New York Application September 13, 1954, Serial No. 455,482

12 Claims. (Cl. 313—60)

The present invention relates in general to bearings, and has more particular reference to anti-friction structures for supporting rotatable devices for turning movement under service conditions substantially inhibiting conventional lubrication of the bearing structure, the invention specifically contemplating an improved bearing structure for turnably supporting the anode of an X-ray generator, wherein the bearing structure is required to operate under the high temperature and low pressure conditions which prevail within the envelope of the X-ray generating tube.

Conventional bearing structures for turnably supporting X-ray tube anodes may comprise a pair of spaced apart roller bearings, as illustrated, for example, in U. S. Letters Patent No. 2,230,857, issued February 4, 1941, upon the invention of Zed J. Atlee in Bearing. In such conventional structures it is necessary to make allowance for both axial and radial movement in order to accommodate the differential expansion of the several components when operated at maximum temperature which, in the usual X-ray generating tube, may be of the order of 450° C. at the bearings.

As disclosed in said Letters Patent, accommodation for differential expansion may be provided by employing bearings having split inner races in conjunction with yielding spring means normally holding the sections of the split inner race means in operative position, while permitting the same to yieldingly separate axially of the bearing structure to thereby accommodate expansion of the parts. Alternately, the bearing races and roller elements may be sized to provide radial looseness embodying a tolerance of the order of 0.003", such tolerance permitting axial end play in the bearing structure of the order of 0.010" or more.

Such bearing looseness may result in a relatively high noise level of variably fluctuating, and consequently somewhat unpleasant, character. While noise at a constant level, in itself, may not be particularly displeasing or aggravating to an auditor, the noise effect commonly known as "galloping" noise, which is caused by relatively slow axial oscillation of the rotating parts due to bearing end play, frequently proves to be a source of annoyance to the patient as well as the operating technician in charge of X-ray equipment.

An important object of the present invention is to provide means for inhibiting axial movement in bearings, especially bearings of the sort employed for turnably mounting X-ray tube anodes, to thereby prevent the emission of "galloping" noise during the operation of the X-ray tube.

Another important object is to employ, in conjunction with a conventional split bearing affording means for accommodating axial and radial expansion in a structure of the character mentioned, bearing means adapted to inhibit axial play of a turnably supported structure with respect to the shaft on which it is turnably mounted.

Another important object is to employ a pair of angular contact bearings mounted in opposition to inhibit axial play in a bearing structure for the rotating anode of an X-ray tube.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a sectional view through an X-ray generating tube having a rotating anode supported upon a bearing structure embodying the present invention; and Figs. 2 and 3 are enlarged sectional views of portions of the structure shown in Fig. 1.

To illustrate the invention the drawings show an electron flow device comprising an X-ray generating tube 11 embodying anode and cathode structures 12 and 13 mounted in spaced apart relationship, in position to cause the anode to function as a source of X-rays 12' in response to impingement thereon of electrons 13' emitted by the cathode structure. The anode and cathode structures are supported on and enclosed by a sealed and evacuated envelope 14, which may conveniently comprise glass, the anode structure providing a rotating electron target member 15 forming a target 15' of ring-like configuration and disposed in position to receive electrons emitted by the cathode structure.

X-ray generating tubes operate for the production of X-rays in response to the impingement at high velocity on the target means of electrons produced by the excitation of the cathodic emission means. X-rays thus generated at the target means may be directed thence as a useful beam projected outwardly of the enclosing envelope. Such high speed electronic impingement upon the target means results in the generation of relatively large quantities of heat therein, such heat being dissipated through and outwardly of the enclosing envelope. When in operation, the temperature of the target portion of the anode structure may be of the order of 1300° C., it being usual, in the interests of efficiency, to operate the generator so that the anode target at the area of electron impact functions at a temperature just short of the softening temperature of the constituent material of the target.

As shown, the envelope 14 may comprise a sleeve-like, preferably cylindrical section 16 sized to relatively closely enclose the anode structure 12 at one end of the envelope, a medial envelope section 17 of hollow, preferably cylindrical configuration joined integrally with the sleeve portion 16 at one end thereof, said medial portion having substantially greater sectional size than the portion 16 and being coaxial therewith, and a sleeve-like, generally cylindrical envelope section 18, sized to relatively snugly enclose the cathode structure 13, the section 18 being integrally joined and connected with the medial section 17, at the end thereof remote from the section 16, said section 18 having its longitudinal axis eccentrically offset with respect to the common central axis of the sections 16 and 17, whereby to dispose the cathode structure in alinement with the electron target 15' on one side of the member 15.

The anode structure 12 provides support means 19 for turnably mounting the target member 15 in the envelope, said support means being disposed within the envelope section 16 and mounted at one end upon a re-entrant portion 16' of said section. The support means may extend at its opposite end substantially at the junction of the envelope sections 16 and 17, whereby the target member 15 may be mounted upon the support means 19 and carried thereby in position extending within the medial envelope section 17, said target member preferably comprising a disk having peripheral portions carrying the ring-like electron target 15' in position for rotary movement about the central axis of the envelope sections 16 and 17, thereby traveling the ring-like target continuously in alinement with the axis of the offset envelope section 18 in which the cathode 13 is disposed.

The support means 19 may conveniently comprise a central axle steam 20 of metal, such as steel, sealingly secured as by welding the same upon preferably cup-shaped metal mounting and sealing means 21, whereby the stem is secured upon the re-entrant envelope portion 16' in position extending in coaxial alinement with respect to the axis of the envelope sections 16 and 17. As shown, the mounting means 21 may conveniently comprise a cylindrical metal shell 21' having a circular edge making a glass-to-metal seal 22 with the inner end of the re-entrant envelope portion 16', the opposite end of the shell 21' being sealed, as by brazing the same, to the peripheral edges of a mounting disk 23. The disk 23 may be formed with a central opening through which the stem 20 may extend, the stem and disk being sealingly secured, as by brazing the same together around the edges defining the central opening of the disk. The stem 20 thus has an extension 20' extending within the re-entrant envelope portion 16' and hence exposed outwardly of the envelope, the remaining portions of the stem 20 extending within the envelope section 16.

The stem 20 within the envelope section 16' carries suitable bearing means for turnably supporting the target member 15, said bearing means preferably comprising roller bearings 24 and 25, mounted in spaced relation on the stem 20. The support means 19 provides for mounting the target member 15 upon the roller bearings 24 and 25. To that end, the support means 19 may comprise a sleeve-like support member 26 mounted on the bearing means 24 and 25, and hence turnably supported with respect to the stem 20. The sleeve-like support member 26, in turn, may carry a tubular mounting frame 27, of material such as copper, in position snugly embracing and surrounding the support member 26 and firmly secured thereto, as by rivets 28 or other suitable fastening devices.

The frame 27 may include portions projecting outwardly of the opposite ends of the member 26 to provide a skirt 29 in position surrounding and enclosing the mounting means 21 and its glass-to-metal seal with the re-entrant envelope portions 16', at one end of the support member 26. The end of the frame 27, remote from the skirt 29, may be provided with an end closure 30 carrying a stub shaft 31 having an end extending through a central opening formed at the target member 15.

The target member 15 may have any suitable or preferred form and may comprise any preferred target material. As shown, the member 15 may comprise a rearwardly dished disk of tungsten formed with a central opening for snugly receiving the end of the stub shaft 31, which may be riveted or peened over upon the front face of the disk to hold the same securely on the stub shaft.

Since it is desirable to operate the X-ray generator in fashion producing temperatures of the order of 1300° C. at the target face, it is necessary that the target member be rotated at high speed in order to minimize the danger of destructively overheating the target surface at the point of electron impact. The heat thus generated at the target face is, of course, dissipated thence outwardly of the envelope 14; and some of said heat penetrates into the turnable anode supporting means 19, including the roller bearings 24 and 25, which consequently operate at temperatures which fluctuate between high temperatures of the order of 450° C. and normal atmospheric temperature. Such temperature variation, of course, results in expansion and contraction of the parts which must be accommodated in the bearings.

Accordingly, the bearing 24 may comprise a plurality of balls 32 forming roller elements contained in circular arrangement within an outer race 33 snugly seated for axial self-adjusting movement in a seat 34 formed within and at one end of the support member 26. The bearing 24 may also comprise a pair of cooperating parts 35 forming split inner race means clampingly secured upon the stem 20. Alternately, the bearing 24 may comprise unitary inner race means. The bearing 24, however, is sized to afford looseness of the order of 0.003" in a radial direction, and a consequent axial looseness of the order of 0.010"; and the outer race 33, as heretofore mentioned, is free to adjust itself axially in the seat 34, to thereby accommodate expansion of the bearing parts when heated and cooled within the operating temperature range of the apparatus.

The present invention particularly contemplates the provision of means for holding the member 26 against axial movement with respect to the stem 20 due to the expansion accommodating looseness embodied in the bearing 24. To this end, the bearing means 25 preferably comprises a pair of angular contact bearings 36 and 36', each comprising a plurality of balls 37, 37', forming roller elements disposed in circular arrangement within outer races 38, 38', the bearings including inner ball supporting race elements 39, 39', adapted to snugly fit upon the stem 20. The outer races 38, 38' may be secured in end-to-end abutting relationship in a seat 40 formed in the member 26 at the end thereof remote from the seat 34, said seat being defined on one side by an annular flange 41 against which the outer race 38' of the bearing 36' may be supported against relative axial movement on the member 26 in a direction toward the bearing 24. The member 26, at the end of the seat 40 remote from the flange 41, may be provided with means for securing the race 38 of the bearing 36 in the seat 40 in abutting relationship with respect to the race 38' of the bearing 36', said means, as shown, preferably comprising an annular locking rib or flange 42 formed on the member 26 and adapted to be peened over upon the end of the race 38, as at 42', at spaced intervals in the rib 42. If desired, shim means 43 may be interposed between the abutting edges of the races 38 and 38'; and comparable shims 43' may be interposed between the abutting ends of the inner races 39 and 39' upon the mounting stem 20.

The inner race elements 35, 39 and 39' may be clampingly secured upon the stem 20, as by providing the stem with a shoulder 44, as at the end thereof adjacent the seal means 21, said shoulder facing toward the seal remote end of the stem. The bearings 36 and 36' may be assembled on the stem 20 in position with the race 39 seating on the shoulder 44, and the race 39' seating upon the race 39. In order to maintain a desired spacement between the bearing 24 and the bearings 25, a spacing sleeve 45 may be applied upon the stem 20 in position bearing at one end upon the race 39', the opposite end of said sleeve forming a shoulder for the support of the inner race means of the bearing 24 which may be secured upon the stem 20, as by means of a clamping nut 46 threadedly connected on the end of the stem 20 remote from the shoulder 44. The nut 46, of course, serves to clampingly secure the inner race elements 35, 39 and 39', and the spacing sleeve 45 in firmly fixed position upon the stem 20, between the shoulder 44 and the clamping nut 46.

The angular contact bearings 36 and 36' are characterized in that the outer races thereof 38 and 38' are formed with shoulders 47, 47' providing race grooves facing axially in one direction only in said races, so that when the balls 37, 37' respectively engage said shoulders 47, 47', axial movement of the balls and hence of the inner races is prevented in one direction with respect to the outer races 38, 38'. As a consequence, by applying the outer races 38 and 38' in the seat 40 with the shoulders 47 and 47' facing in mutually opposite directions, and by adjusting the spacement of the inner races 39 and 39', the bearings 36 and 36' may be assembled in fashion inhibiting relative axial movement of the member 26 in either direction with respect to the stem 20.

The foregoing arrangement, because of the looseness tolerances afforded in the bearing 24, including the axially adjustable race 33, will adequately accommodate all expansion effects encountered in the rotating anode structure 12 within the operating temperature range to which the equipment is subjected in service. At the same time, the employment of a pair of angular contact bearings mounted in opposition in the manner described, will eliminate the possibility of axial end play movement of the bearing structure with respect to the stem on which it is mounted, and thereby prevent the production of galloping noise effects when the device is in operation, without, however, interfering with the expansion accommodating action of the bearing 24 and without impairing the roller action of the bearings 25.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An X-ray generating tube embodying a sealed envelope, a stem forming a support spindle extending in said envelope, an anode structure and bearing means for rotatably supporting said anode structure on said spindle, including roller bearing means on said spindle and supporting the anode structure turnably thereon, said roller bearing means being sized to provide limited radial and axial looseness for the accommodation of thermal expansion of the anode structure, said roller bearing means having a race element mounted for unhampered self-alining axial movement, and a pair of angular contact bearings mounted on said spindle in abutting relatively opposed relationship and in position spaced from said roller bearing means to turnably support said anode structure on the spindle against relative axial movement thereon in either direction.

2. An X-ray generating tube embodying a sealed envelope, a stem forming a support spindle extending in said envelope, an anode structure and bearing means for rotatably supporting said anode structure on said spindle, including roller bearing means on said spindle and supporting the anode structure turnably thereon, said roller bearing means being sized to provide limited radial and axial looseness for the accommodation of thermal expansion of the anode structure, and a pair of angular contact bearings mounted on said spindle in abutting relatively opposed relationship and in position spaced from said roller bearing means to turnably support said anode structure on the spindle against relative axial movement thereon in either direction, said bearing means comprising outer race means in carrying relation and axially self-adjustable with respect to said anode structure.

3. An X-ray generating tube embodying a sealed envelope, a stem forming a support spindle extending in said envelope, an anode structure and bearing means for rotatably supporting said anode structure on said spindle, including roller bearing means on said spindle and supporting the anode structure turnably thereon, said roller bearing means being sized to provide limited radial and axial looseness for the accommodation of thermal expansion of the anode structure, and a pair of angular contact bearings mounted on said spindle in abutting relatively opposed relationship and in position spaced from said roller bearing means to turnably support said anode structure on the spindle against relative axial movement thereon in either direction, said bearing means comprising an outer race element in carrying relation and freely self-adjustable axially with respect to said anode structure, said bearing means and contact bearings comprising races clampingly secured in axially alined and spaced relation on said spindle.

4. An X-ray generating tube embodying a sealed envelope, a stem forming a support spindle extending in said envelope, an anode structure and bearing means for rotatably supporting said anode structure on said spindle, including roller bearing means on said spindle and supporting the anode structure turnably thereon, said roller bearing means being sized to provide limited radial and axial looseness for the accommodation of thermal expansion of the anode structure, and a pair of angular contact bearings mounted on said spindle in abutting relatively opposed relationship and in position spaced from said roller bearing means to turnably support said anode structure on the spindle against relative axial movement thereon in either direction, said bearing means comprising an outer race element in carrying relation and freely self-adjustable axially with respect to said anode structure, said angular contact bearings comprising outer race elements secured in adjacent end-to-end relation on said anode structure, and inner races secured on said spindle in precisely spaced relation to eliminate axial motion in said bearings.

5. An X-ray generating tube embodying a sealed envelope, a stem forming a support spindle extending in said envelope, an anode structure and bearing means for rotatably supporting said anode structure on said spindle, including roller bearing means on said spindle and supporting the anode structure turnably thereon, said roller bearing means being sized to provide limited radial and axial looseness for the accommodation of thermal expansion of the anode structure, and a pair of angular contact bearings mounted on said spindle in abutting relatively opposed relationship and in position spaced from said roller bearing means to turnably support said anode structure on the spindle against relative axial movement thereon in either direction, said bearing means comprising an outer race element in carrying relation and freely self-adjustable axially with respect to said anode structure, said bearing means comprising outer race means in carrying relation and axially self-adjustable with respect to said anode structure, and said angular contact bearings comprise outer race elements secured in adjacent end-to-end relation on said anode structure, and inner races secured on said spindle in precisely spaced relation to eliminate axial motion in said bearings.

6. An X-ray generating tube embodying a sealed envelope member, an anode member and means to turnably support the same in said envelope member, comprising means forming a hollow support frame secured on one of said members, a stem forming a spindle extending within said hollow frame and secured to the other of said members, bearing means for rotatably interconnecting said frame and spindle, including roller bearing means on said spindle and engaging said frame, said roller bearing means being sized to permit limited relative radial and axial movement between the frame and spindle for the accommodation of thermal expansion of the parts, said roller bearing means having a race element mounted for unhampered self-alining axial movement, and a pair of angular contact bearings mounted on said spindle in abutting relatively opposed relationship and spaced from said roller bearing means, said angular contact bearings turnably interconnecting said frame and spindle against relative axial movement thereof in either direction.

7. An electron flow device embodying a sealed envelope member, an electrode member and means to turnably support the same in said envelope member, comprising means forming a hollow support frame secured on one of said members, a stem forming a spindle extending within said hollow frame and secured to the other of said members, bearing means for rotatably interconnecting said frame and spindle, including roller bearing means on said spindle and engaging said frame, said roller bearing means being sized to permit limited relative radial and axial movement between the frame and spindle for the accommodation of thermal expansion of the parts, said roller bearing means having a race element mounted for unhampered self-alining axial movement, and a pair of angular contact bearings mounted on said spindle in abutting relatively opposed relationship and spaced from said roller bearing means, said angular contact bearings turnably interconnecting said frame and spindle against relative axial movement thereof in either direction.

8. An electron flow device embodying a sealed envelope, a stem forming a support spindle extending in said envelope, an electrode structure and bearing means for rotatably supporting said electrode structure on said spindle, including roller bearing means on said spindle and supporting the electrode structure turnably thereon, said roller bearing means being sized to provide limited radial and axial looseness for the accommodation of thermal expansion of the electrode structure, said roller bearing means having a race element mounted for unhampered self-alining axial movement, and a pair of angular contact bearings mounted on said spindle in abutting relatively opposed relationship and in position spaced from said roller bearing means to turnably support said electrode structure on the spindle against relative axial movement thereon in either direction.

9. An electron flow device embodying a sealed envelope, a stem forming a spindle extending within and supported at one end thereof on said envelope, a sleeve-like frame and bearing means for rotatably interconnecting said frame and spindle, including roller bearing means on said spindle, remote from the supported end thereof, in position engaging said frame, said roller bearing means being sized to permit limited relative radial and axial movement between the frame and spindle for the accommodation of thermal expansion of the parts, said roller bearing means having a race element mounted for unhampered self-alining axial movement, and a pair of angular contact bearings mounted on said spindle, between said roller bearing means and the envelope supported end of the spindle, said bearing elements being mounted in abutting relatively opposed relationship and spaced from said roller bearing means, said angular contact bearings turnably interconnecting said frame and spindle against relative axial movement thereof in either direction.

10. An electron flow device embodying a sealed envelope, a stem forming a support spindle extending in and supported at one end thereof on said envelope, a sleeve-like frame, and bearing means for rotatably supporting said frame on said spindle, including roller bearing means on said spindle, remote from the supported end thereof, in position supporting the frame turnably thereon, said roller bearing means being sized to provide limited radial and axial looseness for the accommodation of thermal expansion of the parts, said roller bearing means having a race element mounted for unhampered self-alining axial movement, and a pair of angular contact bearings mounted on said spindle adjacent the envelope supported end thereof, said elements being mounted in abutting relatively opposed relationship and spaced from said roller bearing means, said angular contact bearings turnably supporting said frame on the spindle against relative axial movement thereon in either direction.

11. An electron flow device embodying a sealed envelope, an electrode and means to turnably support the same in said envelope, comprising a stem forming a spindle having a mounting portion secured on said envelope and a supporting portion extending within said envelope, a hollow electrode support frame enclosing the supporting portion of said spindle and carrying said electrode within the envelope, and bearing means for turnably carrying said hollow frame on said spindle, including roller bearing means secured on said spindle in position spaced inwardly of the mounting portion thereof, said roller bearing means having a race element supportingly engaging a seat on said hollow support frame, said race element being free for self-adjusting axial movement on said seat, and a pair of angular contact bearings secured on said spindle, in abutting relatively opposed relation, adjacent the mounting portion of said stem and between said mounting portion and said roller bearing means, said angular contact bearings having race elements secured to said frame whereby to turnably interconnect said frame and spindle in fashion preventing relative axial movement thereof in either direction.

12. An electron flow device embodying a sealed envelope, an electrode and means to turnably support the same in said envelope, comprising a stem forming a spindle having a mounting portion secured on said envelope and a supporting portion extending within said envelope, a hollow electrode support frame enclosing the supporting portion of said spindle and carrying said electrode within the envelope, and bearing means for turnably carrying said hollow frame on said spindle, including roller bearing means supported on said spindle inwardly of the mounting portion thereof, and a pair of angular contact bearings carried on said spindle in abutting relatively opposed relation between said roller bearing means and the mounting portion of said spindle, said roller bearing means and angular contact bearings having inner race elements secured in coaxial alinement and fixed position upon the supporting portion of said spindle, said roller bearing means having an outer race element in supporting engagement with and freely movable axially on a seat formed on said hollow electrode support frame, for accommodation of thermal expansion of the parts, said angular contact bearings each having an outer race element secured against axial movement on and with respect to said hollow electrode support frame, whereby to turningly interconnect said frame and spindle in fashion preventing relative axial movement thereof in either direction.

References Cited in the file of this patent
UNITED STATES PATENTS

| | | |
|---|---|---|
| 1,736,972 | Hutchinson | Nov. 26, 1929 |
| 2,141,924 | Middel | Dec. 27, 1938 |
| 2,232,159 | Blood | Feb. 18, 1941 |
| 2,315,280 | Skehan et al. | Mar. 30, 1943 |
| 2,648,025 | Agule | Aug. 4, 1953 |
| 2,786,954 | Atlee | Mar. 26, 1957 |